(12) United States Patent
Tokui

(10) Patent No.: US 8,441,539 B2
(45) Date of Patent: May 14, 2013

(54) IMAGING APPARATUS

(75) Inventor: Kei Tokui, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 79 days.

(21) Appl. No.: 12/992,941

(22) PCT Filed: May 14, 2009

(86) PCT No.: PCT/JP2009/058981
§ 371 (c)(1),
(2), (4) Date: Nov. 16, 2010

(87) PCT Pub. No.: WO2009/147939
PCT Pub. Date: Dec. 10, 2009

(65) Prior Publication Data
US 2011/0063460 A1    Mar. 17, 2011

(30) Foreign Application Priority Data
Jun. 6, 2008 (JP) ................................. 2008-149268

(51) Int. Cl.
*H04N 5/228* (2006.01)
(52) U.S. Cl.
USPC ....................................... 348/208.4
(58) Field of Classification Search ............... 348/208.4
See application file for complete search history.

(56) References Cited

U.S. PATENT DOCUMENTS

| | | | | |
|---|---|---|---|---|
| 7,149,262 B1* | 12/2006 | Nayar et al. | ................ | 375/341 |
| 2004/0238718 A1* | 12/2004 | Washisu | ................ | 250/201.2 |
| 2006/0054794 A1* | 3/2006 | Senba | ................ | 250/226 |
| 2007/0291114 A1* | 12/2007 | Oshima | ................ | 348/126 |
| 2008/0112644 A1 | 5/2008 | Yokohata et al. | | |
| 2008/0143841 A1* | 6/2008 | Tico et al. | ................ | 348/208.99 |

FOREIGN PATENT DOCUMENTS

| | | |
|---|---|---|
| JP | 2002-330335 A | 11/2002 |
| JP | 2004-289709 A | 10/2004 |
| JP | 2005-159806 A | 6/2005 |
| JP | 2006-80844 A | 3/2006 |
| JP | 2006-94085 A | 4/2006 |
| JP | 2006-229868 A | 8/2006 |
| JP | 2006-246309 A | 9/2006 |
| JP | 2008-124625 A | 5/2008 |

* cited by examiner

*Primary Examiner* — Chieh M Fan
*Assistant Examiner* — Fayez Bhuiyan
(74) *Attorney, Agent, or Firm* — Birch, Stewart, Kolasch & Birch, LLP

(57) ABSTRACT

Provided is an imaging apparatus that can achieve a clear image in which motion blur is reduced even when a moving subject is photographed in a dark environment. The imaging apparatus (1) is equipped with multiple photoelectric conversion element groups, whereby a pickup image is generated based on intermediate image data read from each of the photoelectric conversion element groups. The apparatus (1) is equipped with an exposure time setting portion (12b) that sets the exposure time for each element group during imaging, and an exposure time for carrying out multiple exposures during one imaging cycle is set for at least one element group. In addition, the apparatus (1) is equipped with a motion detecting portion (12c) that detects motion information for images from multiple intermediate image data read corresponding to the multiple exposures by said element group, and a motion blur compensating portion (12d) that corrects the intermediate image data read from the other element groups using said motion information, and a pickup image is generated based on the multiple intermediate image data and the corrected intermediate image data.

3 Claims, 5 Drawing Sheets

IMAGING APPARATUS

TECHNICAL FIELD

The present invention relates to an imaging apparatus that improves image quality, and more particularly, to an imaging apparatus that improves image quality when a subject in motion is shot.

BACKGROUND ART

When an object in motion is shot by an imaging apparatus, the subject has hitherto been shot as a blurred image without sharpness as a shutter speed increases. This is caused because the subject moves during the period of opening the shutter, i.e., during the exposure, and the movement is recorded as one image.

A technique is recently in widespread use that oscillates a lens or an imaging element to reduce blurring if an imaging apparatus moves. However, this method is inapplicable to the case where a certain subject moves. This is because the background does not move while the subject moves.

Patent Document 1 discloses a shooting method in which an image is recorded when the movement of the subject is not detected by comparing a first image and a second image taken at different moments. However, this method is applicable to take an image with less motion blur when a stationary object is shot, but not applicable to shoot a moving object.

Techniques for shooting a subject in motion without blurring include those disclosed in Patent Document 2, for example. In those techniques, a motion vector is detected from two consecutive images and a shutter speed is changed depending on the amount thereof to acquire a less blurred still image.

PRIOR ART DOCUMENT

Patent Document

Patent Document 1: Japanese Laid-Open Patent Publication No. 2005-159806
Patent Document 2: Japanese Laid-Open Patent Publication No. 2002-330335

SUMMARY OF THE INVENTION

Problems to be Solved by the Invention

However, although the method of Patent Document 2 can be effective in a very bright scene, if an image is taken in a dark environment, a shutter speed is increased and, therefore, a dark image can only be acquired with a subject indistinguishable. Since the shutter speed is increased, image quality is problematically reduced due to deterioration of S/N ratio.

The present invention was conceived in view of the above situations and it is therefore the object of the present invention to provide an imaging apparatus capable of acquiring a sharp image with motion blur reduced even when a moving subject is shot in a dark environment.

Means for Solving the Problems

To solve the problems, a first technical means of the present invention is an imaging apparatus having a plurality of photoelectric conversion element groups to generate a pickup image based on intermediate image data read from the photoelectric conversion element groups, comprising: an exposure time setting portion for setting an exposure time at the time of shooting for each of the photoelectric conversion element groups that sets an exposure time causing a plurality of exposures to be performed in one shooting for at least one of the photoelectric conversion element groups unlike another photoelectric conversion element group; a motion detecting portion that detects motion information of an image from a plurality of inter mediate image data read in accordance with a plurality of exposures from the photoelectric conversion element group with the exposure time set to cause a plurality of exposures to be performed; and a motion blur compensating portion that compensates the intermediate image data read from the another photoelectric conversion element group by using the detected motion information, and generating the pickup image based on the plurality of the intermediate image data and the compensated intermediate image data.

A second technical means is the imaging apparatus as defined in the first technical means, wherein the exposure time set for the another photoelectric conversion element group is within a total exposure time of a plurality of exposures performed for at least one of the plurality of the photoelectric conversion element groups.

A third technical means is the imaging apparatus as defined in the first or second technical means, wherein the photoelectric conversion element group is disposed for each color and the exposure time causing a plurality of exposures to be performed in one shooting is set for the photoelectric conversion element group of a color predicted to be quickest to reach saturation of a pixel value when a subject is shot.

A fourth technical means is the imaging apparatus as defined in the first or second technical means, wherein the photoelectric conversion element group is disposed for each of red, green, and blue and wherein the exposure time causing a plurality of exposures to be performed in one shooting is set for the photoelectric conversion element group of the blue.

A fifth technical means is the imaging apparatus as defined in the first or second technical means, wherein the plurality of the photoelectric conversion element groups includes a photoelectric conversion element group responsive to a whole visible light range and the exposure time causing a plurality of exposures to be performed in one shooting is set for the photoelectric conversion element group.

EFFECT OF THE INVENTION

According to the imaging apparatus of the present invention, a sharp image can be acquired with motion blur reduced even when a moving subject is shot.

EMBODIMENTS OF THE INVENTION

The present invention will now be described in detail with reference to the drawings. Configurations in figures are depicted with exaggeration for better understanding and have intervals and sizes different from implementations.

An imaging apparatus of the present invention includes a plurality of photoelectric conversion element groups and an intermediate image (data) is generated for each of the photoelectric conversion element groups by reading information of light applied to the photoelectric conversion elements during an exposure whenever the exposure time has elapsed and an output image (taken image) is generated based on the intermediate image.

Figure 1:
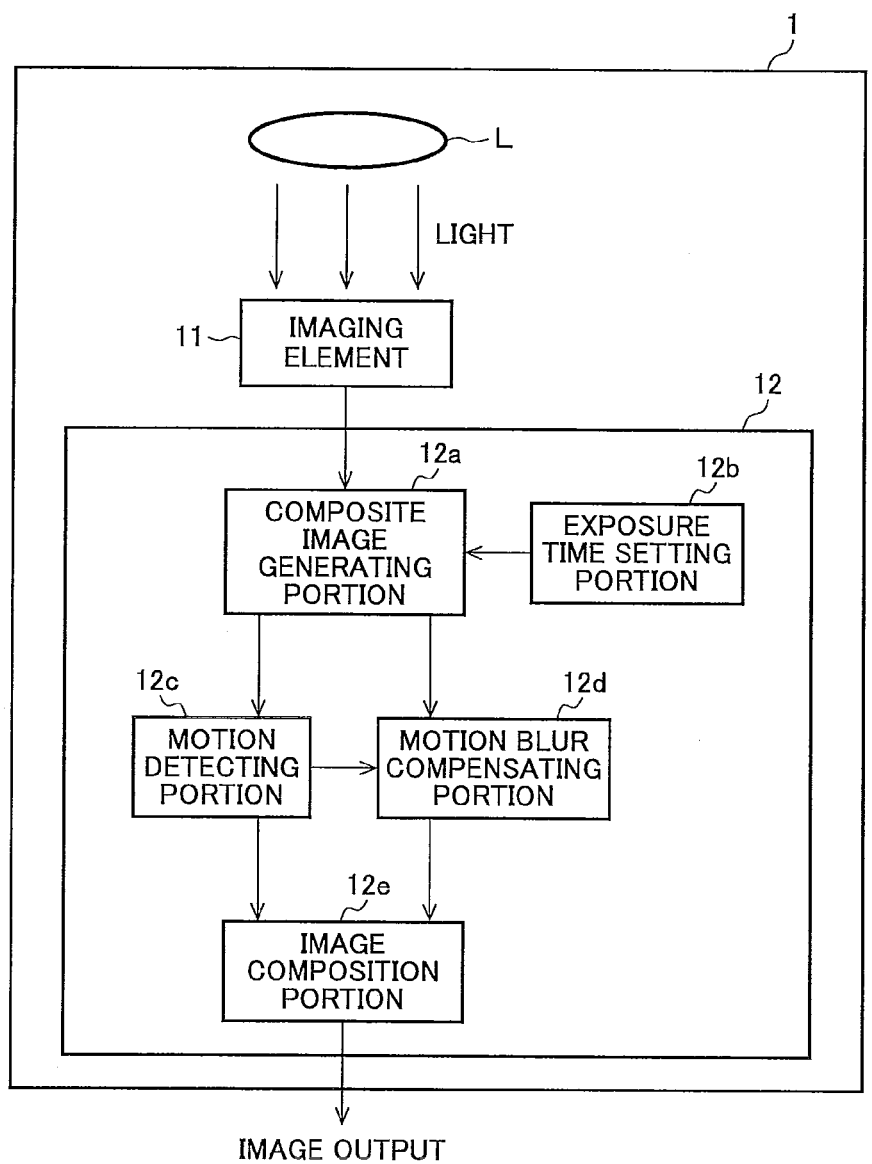
FIG. 1 is a diagram showing an exemplary configuration of an imaging apparatus of the present invention.

FIG. 1 is a diagram showing an exemplary configuration of an imaging apparatus of the present invention. An imaging apparatus 1 of the example of FIG. 1 includes an imaging element 11 that receives light transmitted through a lens L and a control portion 12 that controls the whole of the imaging apparatus 1 including the imaging element 11 and the control portion 12 includes a composite image generating portion 12a, an exposure time setting portion 12b, a motion detecting portion 12c, a motion blur compensating portion 12d, and an image composition portion 12e.

The imaging element 11 has one photoelectric conversion element group for each of red (R), green (G), and blue (B) (i.e., has a plurality of photoelectric conversion element groups) and is able to acquire an amount of light received by the photoelectric conversion elements for each of the photoelectric conversion element groups. For the imaging element 11, an X-Y address type solid-state imaging element is usable such as a CMOS (Complementary Metal Oxide Semiconductor) sensor with R-, G-, and B-color filters arranged on the photoelectric conversion elements as a Bayer array, for example. In the following description, a photoelectric conversion element group receiving light through the R-color filter is referred to as an R-pixel; a photoelectric conversion element group receiving light through the G-color filter is referred to as a G-pixel; and a photoelectric conversion element group receiving light through the B-color filter is referred to as a B-pixel. It is assumed for the imaging element 11 that parameters related to image generation other than exposure time (such as diaphragm) are common to the pixels.

The image for composition generating portion 12a of the control portion 12 generates a composite image (intermediate image data) by reading from the imaging element 11 the information of an amount of light applied to the photoelectric conversion elements during an exposure time whenever the exposure time has elapsed during a shooting period (a period necessary for generating an output image or a release period of a mechanical shutter (not shown) of the imaging apparatus 1).

The exposure time setting portion 12 sets an exposure time at the time of shooting for each of the pixels, i.e., the photoelectric conversion element groups. The exposure time setting portion 12 sets an exposure time causing a plurality of exposures to be performed in one shooting for at least one photoelectric conversion element group (i.e., a shorter exposure time different from other photoelectric conversion element groups is set to at least one photoelectric conversion element group such that the composite image generating portion 12a generates a plurality of composite images for one output image). For example, as described later, for the color predicted to be the quickest to reach saturation of a value detected as a pixel (pixel value) when a subject is shot, the exposure time setting portion 12b sets the shortest exposure time (fastest electronic shutter speed) such that the image for composition generating portion 12a generates a plurality of (e.g., two) composite images. Since the imaging apparatus 1 individually sets exposure times as described above, this can be realized by changing a timing of signal controlling the exposure time for each pixel. Although description will be made later for setting a short exposure time capable of generating a plurality of images for composition for what photoelectric conversion element group under what condition, the determination can be made depending on a shooting mode, for example. The calculation of suitable exposure time can be realized by using an exposure setting method such as those used in a digital camera.

Since the exposure time setting portion 12b sets the exposure time for each photoelectric conversion element group as described above, the image for composition generating portion 12a reads the information of the amount of light in accordance with two exposures to generate two images for composition for a certain color during a shooting period. The two images for composition are consecutively generated. The two image data consecutively generated in the image for composition generating portion 12a are transmitted to the motion detecting portion 12c and other image data are transmitted to the motion blur compensating portion 12d.

If an object in motion (moving object) is included as a subject, since the motion of the moving object can be calculated from the two consecutive images for composition, the motion detecting portion 12c analyzes the two consecutive images for composition to detect the motion of the subject and to calculate motion information. For the calculating method, various methods can be utilized that are used in motion compensation for image compression or double speed drive of a liquid crystal display. The motion detecting portion 12c transmits the calculated motion information to the motion blur compensating portion 12d. The motion detecting portion 12c transmits the two consecutive images for composition to the image composition portion 12e.

A color with one image for composition generated has an exposure time set to a value larger than that of the color with two images for composition consecutively generated. Therefore, if a moving object is included as a subject, the image having the smallest motion blur among the generated images for composition is the image of the color with a shorter exposure time having two images for composition consecutively generated. The images for composition of other colors have motion blur greater than that of the images for composition of the color with the images for composition consecutively generated. Therefore, the motion blur compensating portion 12d compensates the motion blur of the images for composition of colors without two image for composition consecutively generated based on the motion information of the subject detected by the motion detecting portion 12c. The motion blur of the image to be compensated is reduced in conformity to the first or second consecutively generated image. The image compensation is performed to achieve the state at the start of shooting or at the completion of shooting. The motion detecting portion 12c transmits the motion-compensated images for composition of the colors to the image composition portion 12e.

The image composition portion 12e composes the images for composition of the colors including the motion-compensated images into an output image (color image). For the color with two images for composition consecutively generated, the image for composition defined as a reference of the motion blur compensation is used for the composition. Since the images for composition are shot with different values of exposure time, a color image can be generated by composing the images in consideration of these values. The imaging apparatus 1 stores the color image composed in this way in various storage apparatuses or outputs to a monitor.

By suitably setting an exposure time of the photoelectric conversion elements for generating images for composition for each color, a plurality of images for composition is consecutively generated for a certain color to detect the motion of the subject and the motion blur of the images for composition of other colors can be compensated by a plurality of the images of the certain color to reduce the motion blur in the output image based on the images for composition.

Description will then be made for that the exposure time setting portion 12b sets a short exposure time capable of generating a plurality of images for composition for what photoelectric conversion element group under what condition.

Figure 2:
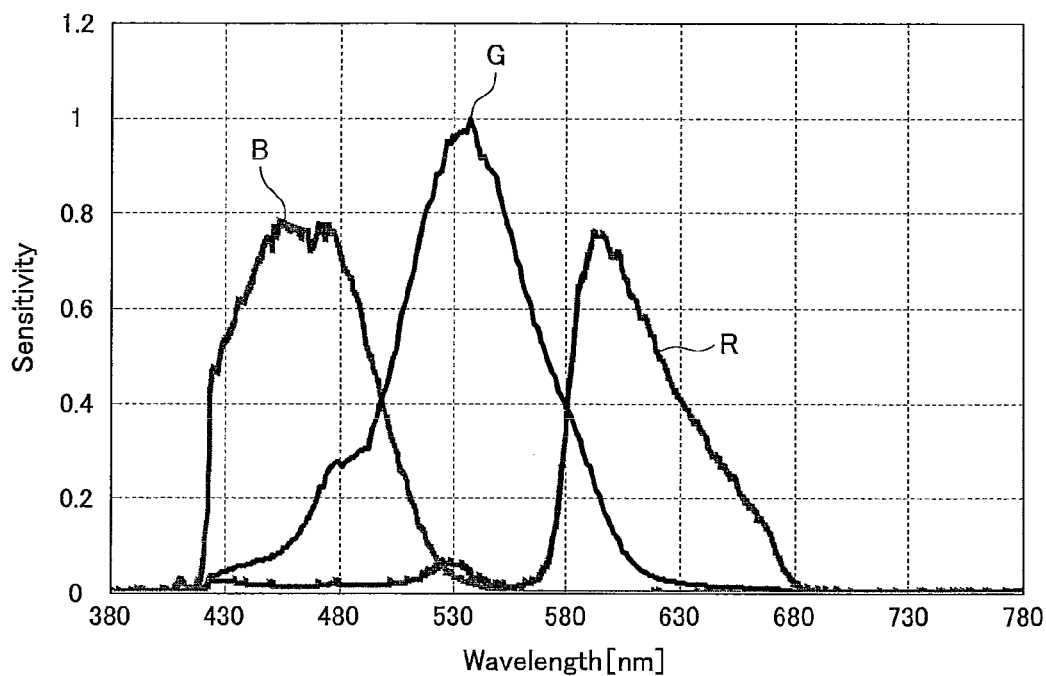
FIG. 2 is a diagram showing an example of spectral sensitivity of an imaging element 11 of FIG. 1
Figure 3:
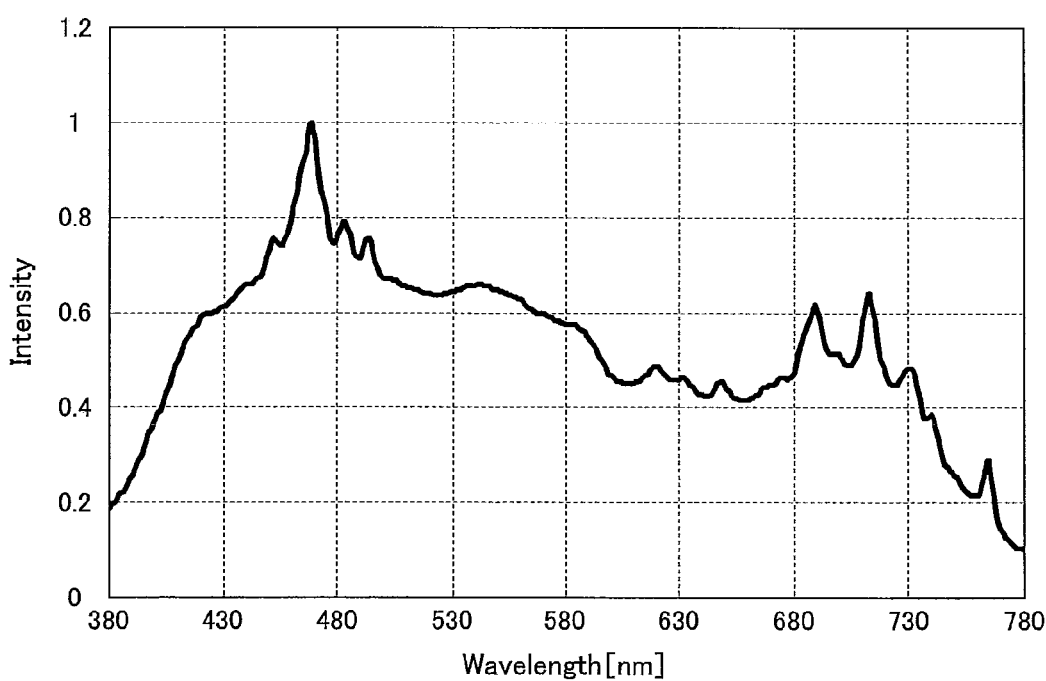
FIG. 3 is a diagram showing a wavelength spectrum of illumination light in a shooting environment assumed in an example of a shooting mode of the imaging apparatus of the present invention.

For example, it is assumed that the spectral sensitivity of the imaging element 11 has a wavelength spectrum depicted in FIG. 2 (R, G, and B of FIG. 2 indicate spectral sensitivities of an R-pixel, a G-pixel, and a B-pixel, respectively, wherein the G-pixel has the highest spectral sensitivity and the spectral sensitivity of each of the R-pixel and the B-pixel is about 80% of that of the G-pixel). It is assumed that the imaging apparatus 1 takes a shot in a shooting mode used under the illumination that has intensities across the whole visible range and has the intensity of red light corresponding to about 60% of that of blue light as depicted in FIG. 3. In this case, to increase gradation values acquired from the photoelectric conversion elements and to generate a high-quality output image, for example, the imaging apparatus 1 sets exposure times as described below.

When an imaging apparatus takes a shot with setting values such as exposure time and diaphragm suitably set, a gradation value of an output image is generally increased when a white subject (one example of a subject of the present invention) is shot.

It is assumed that a conventional imaging apparatus different from the imaging apparatus 1, i.e., an imaging apparatus including the imaging element 11 and having exposure time, diaphragm, etc., of pixels common to the colors is used to actually take a shot under the illumination having intensities across the whole visible range as depicted in FIG. 3 with the exposure time, diaphragm, etc., suitably set. Considering the wavelength sensitivity of the imaging element 11 depicted in FIG. 2 and the wavelength spectrum of the illumination light of FIG. 3, a value detected from the R-pixel is smaller than values detected in the G-pixel and the B-pixel and is about a half of the value of the B-pixel (in a location corresponding to a white part) when a white color is shot in this case. Therefore, the conventional imaging apparatus is unable to fully utilize the resolution of gradation for the R-pixel. This is because the setting values of exposure time, diaphragm, etc., are common to the pixels.

Figure 4:
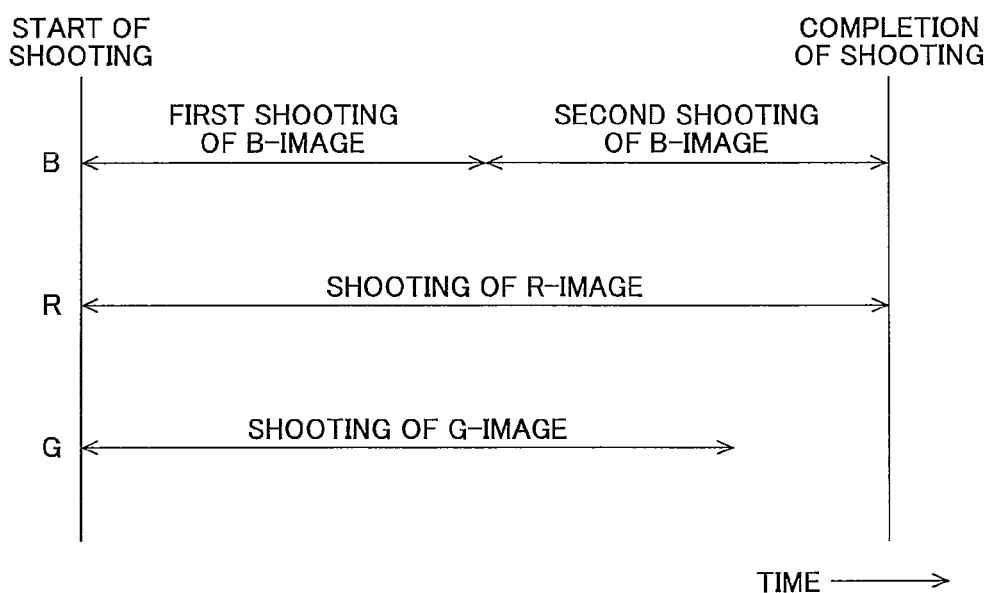
FIG. 4 is a diagram for explaining an example of exposure times and shooting times of colors in the imaging apparatus of the present invention.

In contrast, the imaging apparatus 1 sets values other than the exposure time (such as diaphragm) common to all the pixels and sets an exposure time individually for each pixel. Although the conventional imaging apparatus having common values for all the setting values including exposure time generates a roughly twofold difference between the pixel values of the B-pixel and the R-pixel when a white color is shot under the illumination having the wavelength spectrum of FIG. 3, the imaging apparatus 1 can have substantially the same pixel values for the B-pixel and the R-pixel even when a white color is shot in the same way, for example, by generating a twofold difference between the exposure times as depicted in FIG. 4. For example, if the exposure time of the B-pixel is 1/200 second, it is possible to make the pixel values of the colors almost the same by setting the exposure time of the R-pixel at 1/100 second. This enables the gradation values detected at the R-pixel, the G-pixel, and the B-pixel to utilize the resolution of detected gradation to a maximum limit. That is, better image quality can be achieved by increasing the number of gradations of an image.

As described above, the imaging apparatus 1 operates based on, for example, the exposure times and the shooting times shown in FIG. 4 when having the imaging element 11 with the wavelength sensitivity shown in FIG. 2 and taking a shot in a shooting mode (first shooting mode) used under the illumination with the wavelength spectrum of FIG. 3. In the example of FIG. 4, the exposure times are set as described in (1) and (2) below.

(1) For the color (quickest saturation color) predicted to be the first to reach saturation of a pixel value when a subject (a white subject in this example) is shot under the illumination of the shooting mode, a time expected to be required for the pixel value to saturate when the subject is shot in the shooting mode (expected time for saturation) is set as an exposure time. In FIG. 4, the quickest saturation color is blue.

(2) For colors other than the quickest saturation color, if the expected time for saturation thereof is shorter than twice the expected time for saturation of the quickest saturation color, the expected time for saturation of the color is set as an exposure time (this applies to the G-pixel in the example of FIG. 4). If the expected time for saturation thereof is longer, a value that is twice as large as the expected time for saturation of the quickest saturation color is set as an exposure time (this applies to the R-pixel in the example of FIG. 4).

In this case, the shooting is started for pixels of all the colors at the same time and the generation of one image for composition is first completed for the quickest saturation color (color with the shortest exposure time set). After the generation of the image for composition for the quickest saturation color is completed, the exposure times of pixels of other colors have not elapsed and exposure is continued. In this period, exposure is performed again with respect to the quickest saturation color for which the generation of one image for composition has already completed. Therefore, two images for composition are generated for the quickest saturation color while one image for composition is generated for other colors.

By generating the images for composition to take an image as above, for the quickest saturation color, it is possible to acquire an output image with motion blur reduced by generating two consecutive images for composition, detecting the motion of the subject and compensating the images for composition based on the detected motion, and also possible to improve gradation values of pixels and achieve better image quality by setting the exposure times suitably for each color.

Although one color is used for consecutively generating the images for composition in the above description, two colors may be used and, in the case of an imaging apparatus capable of taking an image in multi primary colors, the consecutive generation may be performed for three or more colors.

Figure 5:
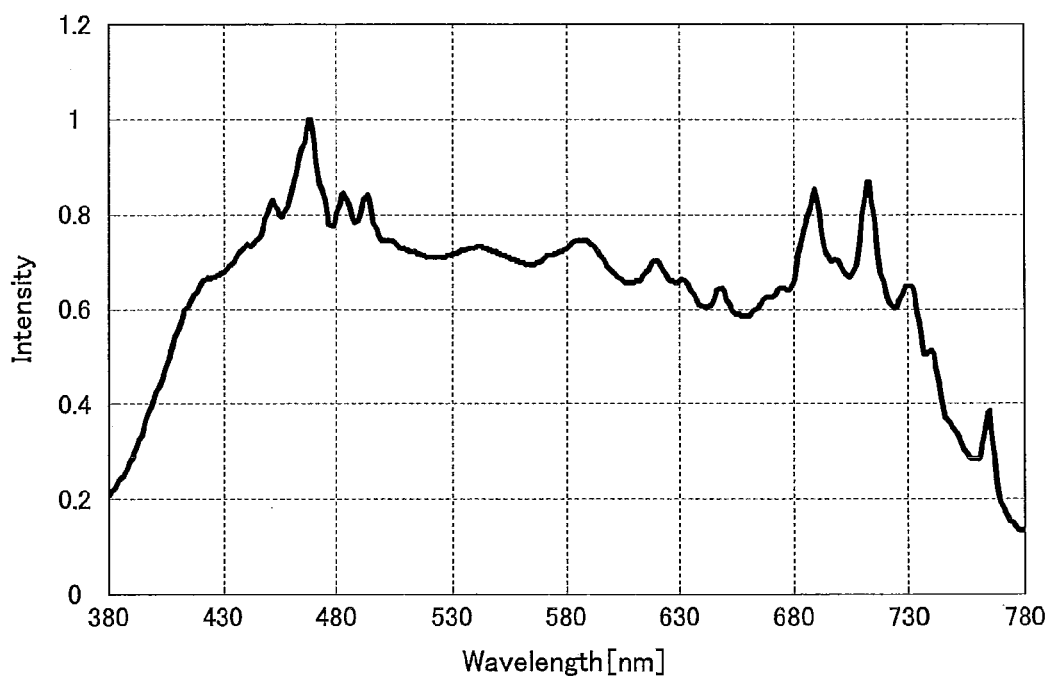
FIG. 5 is a diagram showing a wavelength spectrum of illumination light in a shooting environment assumed in another example of a shooting mode of the imaging apparatus of the present invention.

For example, it is then assumed that the spectral sensitivity of the imaging element 11 has the wavelength spectrum as depicted in FIG. 2 in the same manner as shown in the above example and that the imaging apparatus 1 takes a shot in a shooting mode (second shooting mode) used under the illumination with red light and blue light having the same level of intensity as depicted in FIG. 5 unlike the above example. In this case, to increase gradation values acquired from the photoelectric conversion elements and to generate a high-quality output image, for example, the imaging apparatus 1 sets exposure times as described below.

It is assumed again that a conventional imaging apparatus in which exposure time, diaphragm, etc., of pixels are common to the colors and suitably set is used to actually take a shot under the illumination having intensities across the whole visible range as depicted in FIG. 5. Considering the wavelength sensitivity of the imaging element 11 of FIG. 2 and the wavelength spectrum of the illumination light of FIG. 5, the pixel values detected from the pixels are similar values when a white color is shot in this case. As apparent from this description, if the exposure times of the pixels are individually set to generate two images for composition for the quickest saturation color as described in (1) and (2) of the above example under this condition, the shooting time is elongated. Since the exposure time is not different between the quickest saturation color and other colors, it is not so effective to compensate motion blur based on the motion information calculated from two consecutive images for composition.

Figure 6:
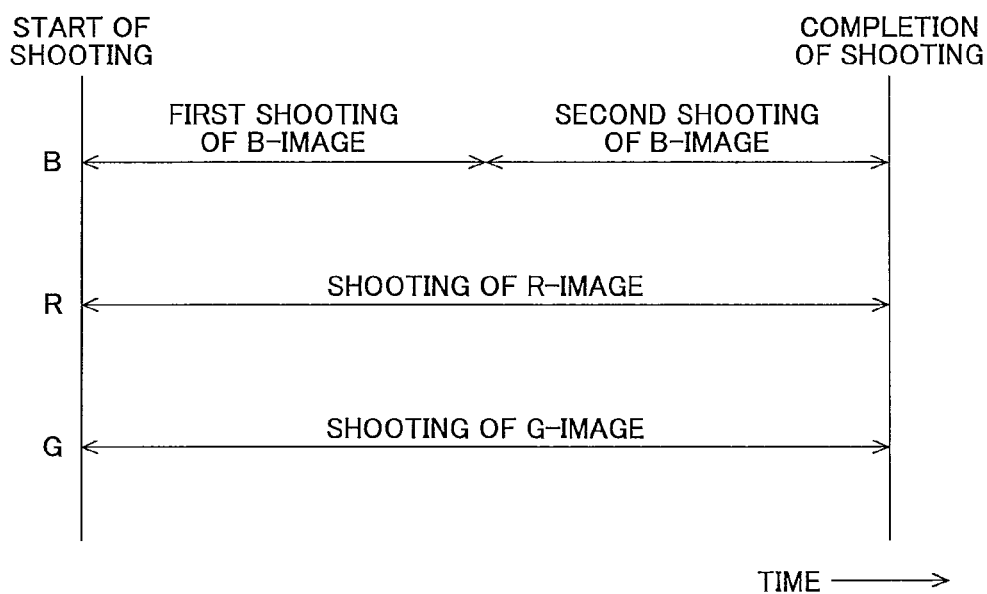
FIG. 6 is a diagram for explaining exposure times and shooting times of colors in the imaging apparatus of the present invention.

Therefore, under this condition, the expected time for saturation is set as an exposure time for two colors other than the color generating two images for composition and an exposure time for one color generating two images for composition is set shorter than that. For example, as shown in FIG. 6, the exposure time is set at a half of the expected time for saturation of the color (last saturation color) predicted to be the last to reach the saturation of a pixel value when a white subject is shot under the illumination of the shooting mode. This prevents the shooting time from being elongated even if two images for composition are consecutively generated. For the color with the exposure time shortened to generate two images for composition, the balance of the colors in an output image is adjustable by adjusting a gain.

Figure 7:
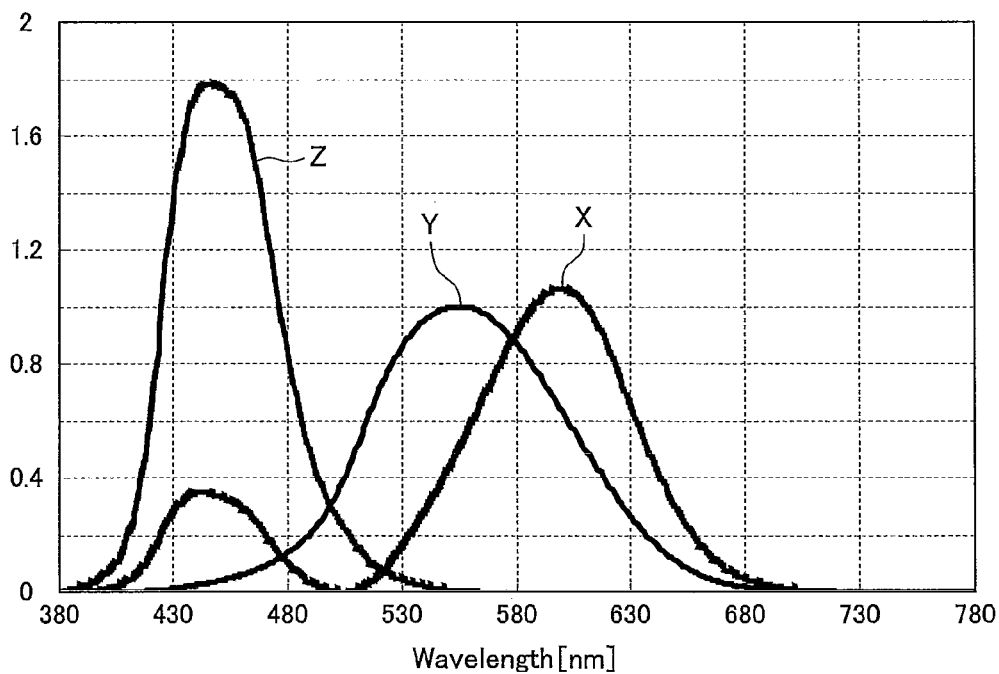
FIG. 7 is a diagram showing a color matching function.

As described above, the imaging apparatus 1 operates based on, for example, the exposure times and the shooting times shown in FIG. 6 when having the imaging element 11 with the wavelength sensitivity shown in FIG. 2 and taking a shot in the second shooting mode used under the illumination with the wavelength spectrum of FIG. 5. When the shooting is performed with three primary colors of red, green, and blue, if the shooting is performed in the second shooting mode as described above, the color that shortens the exposure time is preferably blue as shown in FIG. 6. As can be seen from a color-matching function shown in FIG. 7, green has greatest effect and blue has smallest effect on the luminance among red, green, and blue. Therefore, when the image for output is watched, the blue is the color that makes it most difficult to visually recognize the effect of noise generated by shortening the exposure time and increasing the gain. By shortening the exposure time of the blue, it is possible to minimize the visual recognition of the noise and to reduce the motion blur of the subject.

Figure 8:
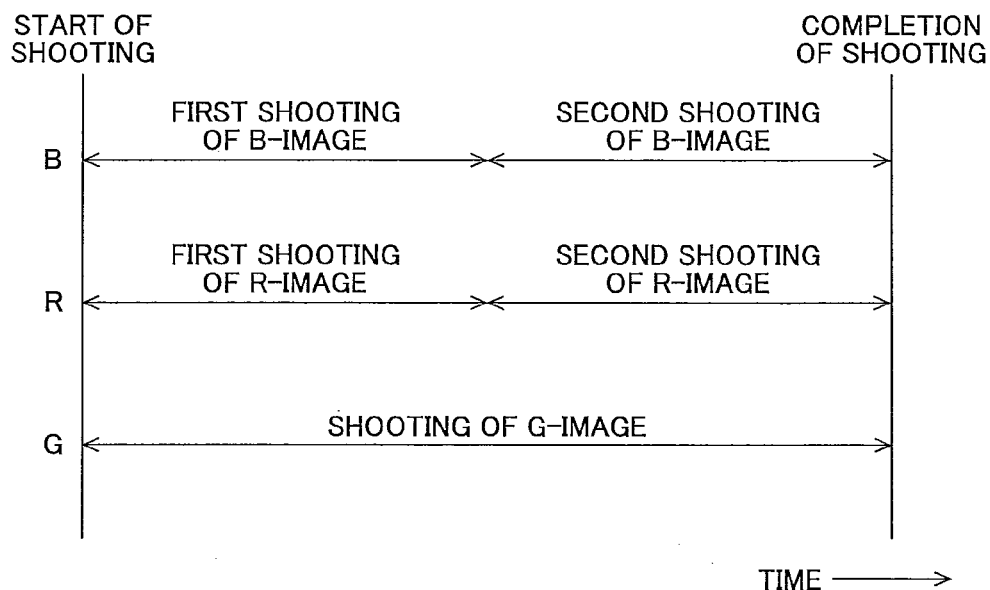
FIG. 8 is a diagram for explaining another example of exposure times and shooting times of colors in the imaging apparatus of the present invention.

When the shooting is performed in the second mode as described above, the exposure time may be shortened as depicted in FIG. 8 to generate two output images for pixels of two colors and the motion blur may be reduced based on these images. In this case, it is preferred to perform the shooting with the exposure time shortened for red and blue except green that has greater effect on the luminance, because the visual recognition of the noise can be suppressed at a lower level. This leads to greater effect of reducing motion blur.

As described above, the imaging apparatus 1 determines to which photoelectric conversion element group is the shorter exposure time that is possible to generate a plurality of images for composition set in accordance with the shooting modes.

In the above example, the expected time for saturation of a certain color is set as an exposure time of the color in accordance with the shooting modes so as to efficiently utilize resolution of gradation of each pixel. Instead of the expected time for saturation, an expected time for a certain rate of saturation may be used, for example. The expected time for a certain rate of saturation means a time expected to be required for the number of gradation value saturated elements for the pixels (whole of the photoelectric conversion element group) to reach a certain rate when a subject is shot under the illumination of the shooting mode.

The configuration of the imaging apparatus is not limited to the above described one. For example, the light from the subject may be separated into colors by a prism, etc., and the respective colors may be received by a red CCD (Charged Coupled Device) sensor or CMOS sensor, a green CCD sensor or CMOS sensor, and a blue CCD sensor or CMOS sensor. In this case, by differentiating an electronic shutter timing (which may be a mechanical shutter timing if a mechanical shutter is disposed for each imaging element) of each imaging element (CCD sensor or CMOS sensor), an exposure time of a photoelectric conversion element group for a certain color is differentiated from that of another color to generate a plurality of images for composition for the certain color and the motion blur is reduced based on the images.

Figure 9:
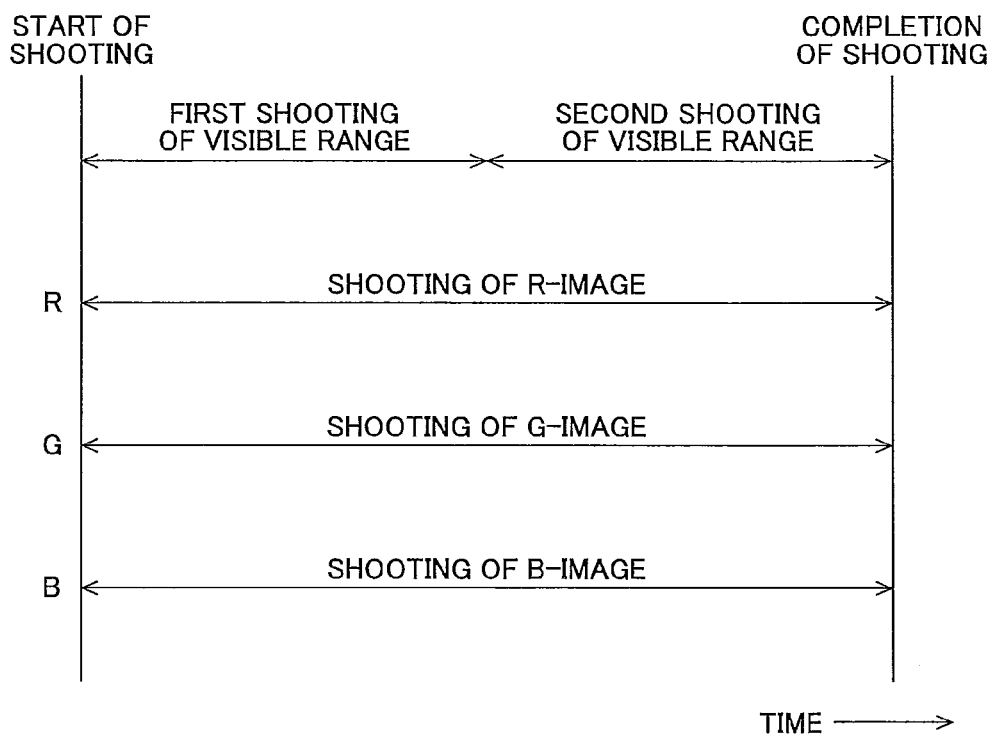
FIG. 9 is a diagram for explaining an example of exposure times of colors, exposure times of photoelectric conversion element groups responsive to the entire visible light range, and shooting times in the imaging apparatus of the present invention.

A photoelectric conversion element group responsive to the whole visible light range is disposed along with the photoelectric conversion element groups for colors (e.g., red, green, and blue) and, as shown in FIG. 9, a plurality of images may be acquired from the photoelectric conversion element group responsive to the whole visible light range for calculating the motion information. In this case, the images for composition of the colors can be compensated based on the calculated motion information and an output image is generated based on the compensated images to reduce the motion blur. Since an amount of light is increased by receiving light from a wider range, which is the whole visible range, as compared to the case of receiving only red, green, and blue lights, the exposure time can be shortened if the shooting environment is the same. The photoelectric conversion element group responsive to the whole visible light range may be disposed within the CMOS sensor of the imaging element 11 in this way. For example, an optical member transmitting a portion of light toward the imaging element 11 and reflecting the remainder may be disposed on the imaging apparatus and the photoelectric conversion element group responsive to the visible light range may be disposed in another CMOS sensor that receives the light reflected by the optical member.

An optical member transmitting a portion of light toward a prism capable of division into colors and reflecting the remainder may be disposed on the imaging apparatus; after the transmission through the optical member and the division into the colors, the colors may be received by a red CCD sensor or CMOS sensor, a green CCD sensor or CMOS sensor, and a blue CCD sensor or CMOS sensor; and the whole visible light range may be received by another CCD sensor or CMOS sensor that receives the light reflected by the optical member.

In another example, a configuration of a multi-eye system having a plurality of combinations of lenses and imaging elements may be used and, in this case, the motion blur can be reduced by differentiating the shutter speed to perform the shooting with the exposure times set to different values.

Although one color image is output by one shooting in the above examples, output of two color images may be enabled in such a way that each of two consecutive images is used as a reference to compensate images of colors with the motion blur compensating portion 12d. Although the number of images consecutively generated for calculating the motion information is two in the above description, the number may be three or more. Although one color is used for consecutively generating images in the above description, two colors may be used and, in the case of an imaging apparatus capable of shooting with a multiplicity of primary colors, the consecutive generation may be performed for three or more colors.

Although the description has been made in terms of a still image, the present invention is applicable to a moving image. For example, if the exposure time is set to $1/120$ second or less for the color with a plurality of images generated for calculating the motion information and the exposure time is set to $1/60$ second or less for other colors in this imaging apparatus, 60 output images can be generated per second with motion blur reduced. This imaging apparatus is able to generate a high-quality motion-blur-reduced moving image consisting of 60 images per second. For example, when the motion blur of an image generated in $1/60$ second is compensated by images generated in $1/120$ second, two compensated image can be generated to record the moving image in $1/120$ second, thereby ensuring higher image quality.

Although the method of Patent Document 2 can be effective in a very bright scene, if an image is taken in a dark environment, a shutter speed is increased and, therefore, a dark image can only be acquired with a subject indistinguishable. Since the shutter speed is increased, image quality is problematically reduced due to deterioration of S/N ratio. In contrast, the imaging apparatus of the present invention is capable of acquiring a sharp image with motion blur reduced even when a moving subject is shot in a dark environment because of the configuration described above.

Explanations of Letters or Numerals

1 . . . imaging apparatus; 11 . . . imaging element; 12 . . . control portion; 12a . . . image for composition generating portion; 12b . . . exposure time setting portion; 12c . . . motion detecting portion; 12d . . . motion blur compensating portion; and 12e . . . image composition portion.

The invention claimed is:

1. An imaging apparatus having a plurality of photoelectric conversion element groups to generate a pickup image based on intermediate image data read from the photoelectric conversion element groups, comprising:

an exposure time setting portion for setting an exposure time at the time of shooting for each of the photoelectric conversion element groups, the exposure time setting portion sets an exposure time causing a plurality of exposures to be performed in one shooting for the photoelectric conversion element group of a color predicted to be quickest to reach saturation of a pixel value when a subject is shot unlike another photoelectric conversion element group, and sets a total time of the plurality of exposures equal to or less than the exposure time of the photoelectric conversion element group of a color predicted to be last to reach saturation of a pixel value when a subject is shot;

a motion detecting portion that detects motion information of a subject from a plurality of intermediate image data read in accordance with a plurality of exposures from the photoelectric conversion element group with the exposure time set to cause a plurality of exposures to be performed; and a motion blur compensating portion that compensates the intermediate image data read from the another photoelectric conversion element group by using the detected motion information, generating the pickup image based on the plurality of the intermediate image data and the compensated intermediate image data; and determining the color predicted to be quickest to reach saturation of a pixel value and the color predicted to be last to reach saturation of a pixel value depending on a shooting mode which is determined with the intermediate image data acquired in the photoelectric conversion element group of each color.

2. An imaging apparatus having a photoelectric conversion element group for each of red, green, and blue to generate a pickup image based on intermediate image data read from the photoelectric conversion element groups, comprising:

an exposure time setting portion for setting an exposure time at the time of shooting for each of the photoelectric conversion element groups, the exposure time setting portion sets an exposure time causing a plurality of exposures to be performed in one shooting for the photoelectric conversion element group of blue;

a motion detecting portion that detects motion information of a subject from a plurality of intermediate image data read in accordance with a plurality of exposures from the photoelectric conversion element group of blue; and a motion blur compensating portion that compensates at least one intermediate image data read including intermediate image data of green among the intermediate image data read from the photoelectric conversion element groups of red and green by using the detected motion information, and generating the pickup image based on the plurality of the intermediate image data and the compensated intermediate image data.

3. An imaging apparatus having a photoelectric conversion element group for each of red, green, and blue to generate a pickup image based on intermediate image data read from the photoelectric conversion element groups, comprising:

an exposure time setting portion for setting an exposure time at the time of shooting for each of the photoelectric conversion element groups, the exposure time setting portion sets an exposure time causing a plurality of exposures to be performed in one shooting for the photoelectric conversion element groups of red and blue;

a motion detecting portion that detects motion information of a subject from a plurality of intermediate image data read in accordance with a plurality of exposures from the photoelectric conversion element groups of red and blue; and a motion blur compensating portion that compensates the intermediate image data read from the photoelectric conversion element group of green by using the detected motion information, and generating the pickup image based on the plurality of the intermediate image data and the compensated intermediate image data.

\* \* \* \* \*